Patented Nov. 5, 1935

2,019,530

UNITED STATES PATENT OFFICE 2,019,530

ENOLIC ETHEREAL SALTS DERIVED FROM INDANTHRONE

David Alexander Whyte Fairweather, Falkirk, and John Thomas, Polmont, Scotland, assignors to Scottish Dyes Limited, a corporation of Great Britain No Drawing. Application April 16, 1931, Serial No. 530,724. In Great Britain April 16, 1930

9 Claims. (Cl. 260—31)

In U. S. application Ser. No. 433,498, we have described the preparation of a tetrasulphuric acid ester of dianthrahydroquinoneazine having the probable formula:

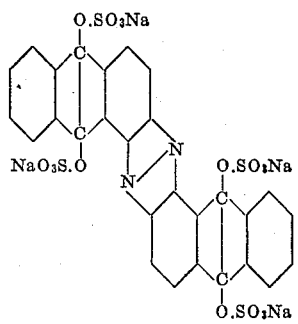

(I)

We now find that when this azine tetra-ester (I) is warmed gently, e. g. at 40° C., for a short time with alkaline hydrosulphite, it is converted into a new tetra-ester, which reverts to the azine tetra-ester when exposed to the oxidizing action of the air. This reduced compound is probably the tetrasulphuric acid ester of dianthrahydroquinone dihydroazine, that is, the tetrasulphuric acid ester of the "normal" leuco 1,2,2',1'-dianthraquinone dihydroazine.

If on the other hand what we have called the azine tetra-ester be subjected to a rather more severe treatment, for example by warming to 60° C., with alkaline hydrosulphite, we obtain another new ester which does not revert to the azine tetra-ester when exposed to air, but yields instead a substance which appears to be a tri-sulphuric ester of dianthrahydroquinone-azine.

This same tri-ester, or a substance closely resembling it, may also be obtained by careful treatment of the azine tetra-ester with acid.

This new tri-ester is surprisingly stable, being capable of isolation in the dry state, and of being evaporated in alkaline solution with little or no decomposition. It is less soluble in water than the azine tetra-ester, dissolves in water with a red color which becomes purple on addition of excess of caustic alkali. It has affinity for vegetable and animal fibres. Towards mineral acids and acid oxidants it behaves in much the same way as the azine tetra-ester; for example, with hydrochloric acid it gives a deep blue color, gradually changing to purple and finally to red, the known di-ester of dianthraquinone dihydroazine being the end-product.

By a still stronger treatment of the azine tetra-ester with alkaline hydrosulphite, we have obtained another new substance, which appears to be the tri-ester of an hydroazine-anthranol, derived possibly by the reduction of one of the four esterified hydroxyl groups (see I) to hydrogen.

Still stronger treatment with alkaline hydrosulphite, or preferably with acid reducing agents, converts the azine tetra-ester into a di-ester, which appears to be identical with the product obtained by oxidation of the ester of 2-amino anthranol as described in our copending U. S. application, Serial No. 463,562. This di-ester is probably an hydroazine di-anthranol ester, produced by reduction of two esterified hydroxyl groups to hydrogen. It is brown in color, very soluble in water, and apparently yields a dianthranol azine on hydrolysis.

Finally we have converted the azine tetra-ester by the action of alkaline hydrolytic agents, e. g. hot caustic soda solution, into a new di-ester. This new compound is brown red in color, and gives at once a blue substance when treated with cold dilute mineral acid. It is possibly the di-ester of a dianthrahydroquinoneazine, formed by hydrolysis of two of the ester groups to hydroxyl groups. It is reducible in the cold by zinc and dilute acetic acid to a bright red solution, which when made alkaline and shaken with air becomes brown and then contains apparently the di-ester of a dianthranol azine. The new di-ester is surprisingly stable to evaporation over a naked flame. Though less soluble in water than the azine tetra-ester, it is much more soluble than the di-ester of anthraquinone-anthrahydroquinone hydroazine. When the new di-ester is made by the hot alkali method there is also formed a small amount of an indanthrone by complete hydrolysis and oxidation. The new di-ester may also be obtained by hydrolysis of the tri-ester of dianthrahydroquinone azine.

In the foregoing we have confined the description to indanthrone itself and its reduction products and esters. It will be evident, however, that similar reasoning applies to substituted indanthrones, their reduction products and the esters derived from them. Symmetrically substituted indanthrones, e. g. 3,3'-dichloroindanthrone, will give rise to a similar number and variety of esters as indanthrone itself. With unsymmetrically substituted indanthrones the number of different esters will of course be even greater.

We have found, for example, that an important and valuable new ester may be derived from 3,3'-dichloroindanthrone. As starting-material for the new ester we use the tri-ester of 3,3'-dichloroindanthrone obtainable by alkaline oxidation of the disulphuric ester of 3-chloro-2-aminoanthrahydroquinone followed by treatment of the resulting tetra-ester with alkaline hydrosulphite under mild conditions, or preferably with dilute acid, so as to give what is probably the tri-ester of 3,3'-dichlorodianthrahydroquinone azine. We have found that this starting-material, i. e. what we have called the tri-ester, is converted by alkaline oxidizing agents (e. g. bleach liquor or alkaline potassium persulphate) into a remarkable new compound, which for convenience we shall refer to as an azine diester. This new product has affinity for vegetable and animal fibres. Thus cotton is dyed in reddish shades, which exhibit the remarkable property of changing at once to full blue dyeings when brought into contact with acid, e. g. 0.5 per cent hydrochloric acid, without the necessity for an oxidant to be present; i. e. treatment with acid alone suffices for the formation of the color. This remarkable property is possibly due to a peculiarity in the constitution of the new ester, which enables the hydrolyzed ester groups to be dehydrogenated by the taking up of hydrogen by the azine nitrogen atoms. It appears, therefore, that for the first time a vat dye sulphuric ester has been produced which may be regarded as acting as its own oxidizing agent.

Similar azine di-esters showing the same remarkable property are obtainable from tri-esters of dianthrahydroquinone azine itself and of other substituted dianthrahydroquinone azines, by the action of alkaline oxidants.

Our investigations have also proceeded in the direction of salts other than sodium and potassium of dianthrahydroquinone azine tetra sulphuric ester.

This body is very unstable in the presence of free acid. In consequence of this, no salt of a weak base can presumably be prepared, since hydrolysis would decompose it, and this agrees with experience. The number of salts is thus strictly limited to those of comparatively strong bases such as the alkali metals, ammonium and the strong organic bases. These may be prepared by the method of double decomposition in concentrated solution. In cases where the salt is not too soluble, the base or a salt of the base is added to the solution of the potassium salt, and the new salt filtered off. In cases (e. g. calcium) where the salt to be made is very soluble it may be obtained from another salt by arranging for an insoluble substance to be precipitated as a by-product, as in the action of calcium perchlorate upon the potassium salt of the ester, where potassium perchlorate is precipitated, leaving the calcium salt in solution.

Substitution products also come into question and mixed salts in which one or more of the ester groups have different basic radicles attached. Complex salts may also be prepared.

The products of our invention are enolic sulphuric esters of the indanthrone series, which contain at least two, but not more than three enolic sulphuric ester groups, and which contain the following characteristic nucleus

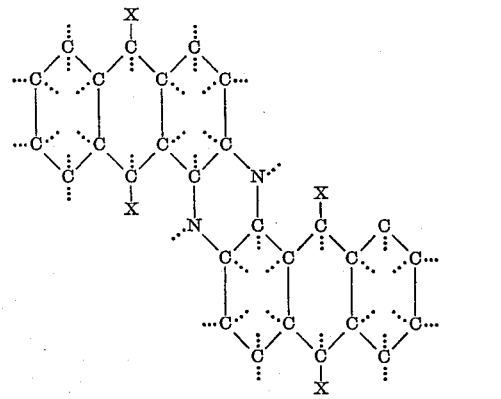

wherein X represents hydrogen, oxygen, an OH group or a sulphuric ester group, at least two, but not more than three, of the substituents designated as X being sulphuric ester groups.

Our invention is illustrated but not limited by the following specific examples, in which the parts are by weight.

*Example 1*

300 parts are taken of a saturated aqueous solution of the ester prepared, for instance according to Example No. 16 of U. S. specification No. 433,498 (Patent No. 1,976,689, issued Oct. 9, 1934) by oxidizing the potassium salt of the disulphuric ester of β-amino-anthrahydroquinone with sodium hypochlorite in the presence of caustic soda, evaporating the resulting solution, fractionally precipitating with potassium chloride, redissolving the comparatively pure ester obtained in water, and precipitating with ethyl alcohol. This solution is stirred at 60° C. with 120 parts of 20 per cent caustic soda solution, and 50 parts of zinc dust for half an hour. The solution gradually acquires a brown-red color. It is filtered from zinc residues and saturated with sodium chloride. The new body which is thus salted out is orange-red in color, dissolving in water to give a solution of similar color.

It appears to be the tri-sulphuric ester of anthrahydroquinone-anthranol hydroazine having the probable formula:

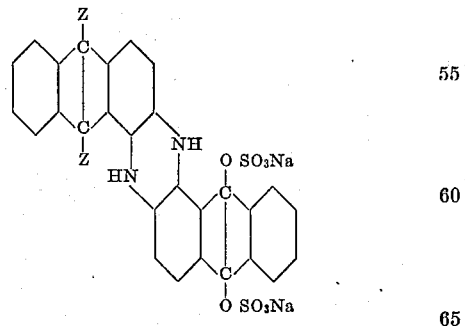

wherein one Z represents O SO₃Na and the other represents H.

*Example 2*

The product obtained in the previous example is dissolved in 250 parts of water, and 2 parts of caustic soda, and 50 parts of 10 per cent hypochlorite liquor. The mixture is stirred for 10 minutes at 50° C. and any excessive hypochlorite removed by the addition of sodium sulphite. The product obtained is apparently a di-ester having the probable formula:

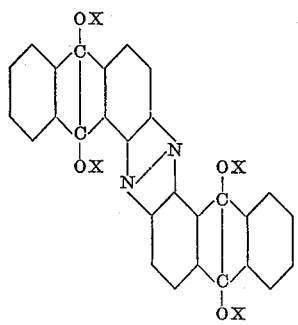

wherein two of the four X's represent H and the other two represent SO₃Na.

*Example 3*

This deals with the treatment of the body which we call the tetra ester with a reducing agent.

800 parts of faintly alkaline aqueous paste containing 20 parts of indanthrone in the form of the tetra ester are heated to 60° C. when the ester is dissolved completely. 10 parts of sodium hydrosulphite (82 per cent purity) and 24.5 parts of 20 per cent caustic soda are dissolved in 100 parts of water and added to the first solution with good stirring. The whole is stirred, preferably in an inert atmosphere, for 2–3 hours, and becomes gradually redder and darker in color.

The mixture is filtered from any impurity, which occasionally also contains a little of what appears to be the disulphuric acid ester of anthraquinone anthrahydroquinone hydroazine, and the filtrate is saturated with common salt. The reddish precipitate is filtered off, and may be purified from any starting material by redissolving in water containing a little alkali and resalting.

The dark reddish paste, which appears to be the trisulphuric acid ester of dianthrahydroquinoneazine, having the probable formula:

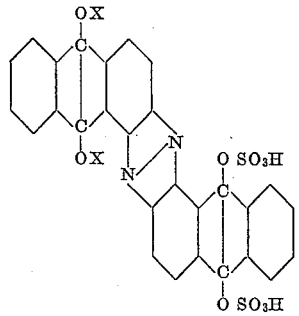

wherein one of the X's represents H and the other represents SO₃Na, dissolves in water with a reddish orange color and on dilution the color goes to a salmon pink. It gives a deep violet color with excess of alkali and with acid turns blue and finally purplish due to the formation of what is apparently the diester. The body has fair affinity for cotton.

*Example 4*

This is an example of the treatment of the body which we call the tetra ester, a larger quantity of sodium hydrosulphite being used than in Example 3 and a different product being obtained, the process being apparently carried a stage further.

20 parts of indanthrone in the form of 200 parts of faintly alkaline aqueous paste of the tetra ester of dianthrahydroquinoneazine are mixed with 122.5 parts of 20 per cent aqueous caustic soda solution and heated to 60° C. A solution of 50 grams of hydrosulphite (82 per cent purity), 36.7 parts of 20 per cent aqueous caustic soda solution, and 150 parts of water is prepared and added to the above, the whole being stirred at 60° C. for 2–3 hours.

The product is a deep brown solution which may be filtered after dilution, or without dilution quickly through a warm filter. The residue is extracted with hot water and a little of the red body which is apparently the diester remains. The first filtrate sets to a jelly on cooling. It may be combined with the second filtrate and the whole salted with potassium chloride, 30 per cent being sufficient to precipitate the product in excellent yield and free from the starting material.

This is the body described in Example 1 and is probably the anthrahydroquinone anthrol azine or di-hydroazine trisulphuric acid ester.

The body is readily soluble in water to a reddish brown solution and in the cold with acids yields a reddish purple body which after being made alkaline again is only very slightly soluble in water but becomes bluer. This latter body is apparently the mono-ester of anthranol anthraquinone hydroazine, having the probable formula:

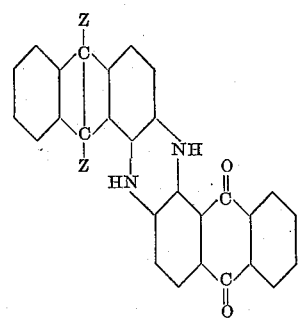

wherein one Z represents H and the other represents O SO₃Na. Either the reddish brown body or the reddish purple body is converted to a purple body by acids at the boil. This latter body is apparently anthranol anthraquinone hydroazine.

*Example 5*

This is similar to Example 4 except that the starting material is the product of Example 3 i. e. the triester, the product obtained being the same.

*Example 6*

This example describes a further method of obtaining the same tri-ester obtained in Example 3.

A faintly alkaline solution of the potassium salt of the tetra ester of concentration 5 parts per thousand is stirred at 15° C. and acidified with a 20 per cent solution of acetic acid until the whole liquor contains 0.4 per cent of acetic acid. The color rapidly changes to a bright orange red, and the reaction is complete in about 5 minutes. The liquor is then made alkaline and evaporated to a fifth of its volume. The product is salted out with potassium chloride and filtered off. The cake is redissolved in warm water, filtered from a little diester and the product salted out again from the filtrate.

This body is apparently identical with the product obtained in Example 3.

Example 7

This is an example of the treatment of the tetra ester of tetrahydro-dianthraquinone azine with caustic soda.

100 parts of a solution of the potassium salt of the tetra ester of 4 per cent strength is boiled with 20 parts of caustic soda for 1 to 2 hours, the liquor being allowed to concentrate by escape of steam. The color of the solution becomes brown during the reaction and the reaction is finished when a test portion of the liquor gives on treatment with dilute hydrochloric acid a pure blue precipitate (not red). The liquor is then diluted with twice its volume of saturated salt solution and filtered cold, or the cold liquor may be filtered without dilution. The filter cake is dissolved in warm water and the solution is filtered to remove insoluble matter. The final product is obtained in a substantially pure form by salting out again. This product appears to be a new di-ester having the probable formula:

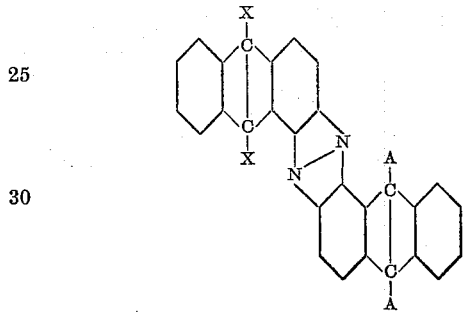

wherein one of the X's and one of the A's represents a sulphuric ester group, the other X and the other A representing OH.

It dissolves in water to give a red-brown solution which turns red on acidification with acetic acid in the cold and gives a blue precipitate on boiling. A blue precipitate is also at once obtained on acidification with hydrochloric acid in the cold.

Example 8

This is an example of the production of what appears a reduction product from the body we call the tetra ester of tetrahydro-dianthraquinone azine and which reverts to the tetra ester on exposure to air.

10 parts of the potassium salt of the dianthrahydroquinoneazine tetrasulphuric acid ester in solution in 50 parts of water are treated with 24.5 parts of 20 per cent caustic soda and 5 parts of sodium hydrosulphite (82 per cent). The liquor is stirred at 40° C. for 15 minutes and there are then added 20 parts of potassium chloride. After cooling to 5° the dark green mass is filtered and washed in the filter with saturated potassium chloride containing carbon dioxide and slightly alkaline with carbonate. The product formed is probably a hydroazine having the formula

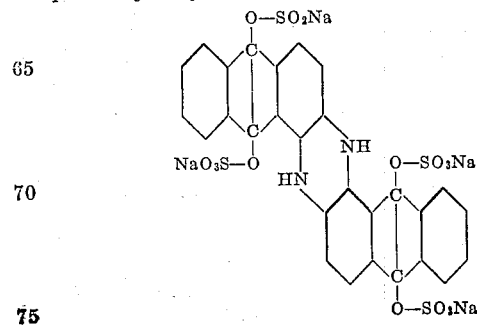

This body dissolves in water to give a dark brown solution which rapidly oxidizes in contact with air to what is apparently the starting material. With acids, the body gives a bright green solution which gradually changes to red-violet on standing.

In place of hydrosulphite, similar substances such as ferrous sulphate and ammonia, or zinc and dilute acetic acid in the cold may be used.

Example 9

In this example we carry the treatment of the tetra-sulphuric acid ester with a reducing agent in acid solution.

To 250 parts of liquor containing 40 parts of the potassium salt of the tetra ester are added 20 parts of zinc dust. The mixture is stirred and 40 parts of acetic acid of 50 per cent strength are run in. The temperature is then raised to 80° C. for 15 minutes. The deep red solution, containing a product having the probable formula:

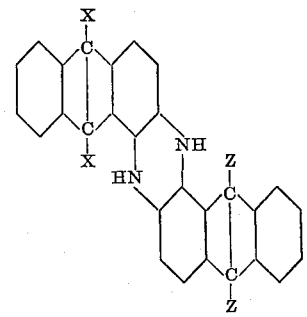

wherein one X and one Z each represent hydrogen and the other X and the other Z each represent $OSO_3Na$, is cooled to 60° C. made alkaline with sodium carbonate and filtered from zinc residues.

On standing in air, the red color changes to brown. When this body is boiled with dilute hydrochloric acid, a brown substance is precipitated which dissolves in alkali to give a brown-purple solution.

Cotton is dyed a brown color by impregnating with the red solution, either before or after standing, and when the dyeing is boiled for 15 minutes in a solution containing 1 per cent each of copper sulphate and hydrochloric acid liquor, a blue shade is obtained.

If instead of dyeing as in the preceding paragraph, the alkaline solution of the body obtained in the last paragraph but one by acid treatment may be used. In this way cotton is dyed a purple-brown shade, becoming red on washing with water or acids and returning towards blue with alkalies.

The brown body obtained when deep red solution has been standing in air is apparently identical with that obtained by oxidation of 2-aminoanthranol ester by the process of U. S. application No. 463,562 (Patent No. 1,970,083, issued Aug. 14, 1934).

Example 10

This is an example of the production of magnesium salt of an ester.

50 parts of a 10 per cent solution of the potassium salt of dianthrahydroquinone azine tetra sulphuric acid ester is treated with 50 parts of crystalline magnesium chloride. The precipitate of the magnesium salt, which is orange in color, is filtered off.

Example 11

This is an example of the production of a lithium salt of an ester.

To 50 parts of the 10 per cent solution of the potassium salt is added 25 parts of anhydrous lithium chloride. The mixture is allowed to stand for a short time and the lithium salt is filtered off. This is a very soluble body yellow in color.

Example 12

This is an example of the production of an ammonium salt.

To 75 parts of a 10 per cent solution of the potassium salt is added 20 parts of ammonium acetate. The ammonium salt crystallizes out and is filtered off.

Example 13

This is an example of the method of production of methyl pyridinium salt of an ester.

To 50 parts of a 10 per cent solution of the potassium salt is added 20 parts of methyl pyridinium chloride. The methyl pyridinium salt is precipitated as pale yellow crystals which are less soluble than the potassium salt.

Example 14

This is an example of the production of a calcium salt.

25 parts of a 20 per cent solution of perchloric acid is neutralized with calcium hydroxide, and any excess of the latter filtered off. This solution of calcium perchlorate is added to 50 parts of the 10 per cent solution of the potassium salt, when potassium perchlorate is precipitated and is filtered off. The calcium salt of the ester remains in the filtrate.

If in place of calcium hydroxide, triethylamine is used, the triethylamine salt of the ester is formed.

Example 15

This example illustrates the preparation of a trisulphuric ester from 3,3'-dichlor-dianthrahydroquinoneazine tetrasulphuric ester in a manner analogous to the method of Example 6.

20 parts of a 25 per cent paste of the tetrasulphuric ester of 3,3'-dichlor-tetrahydro-dianthraquinoneazine (potassium salt) are dissolved in 1000 parts of water at 5° C. To this a 20 per cent solution of acetic acid is added until the whole contains 0.4 per cent of acetic acid.

The color of the solution, originally yellow with a green fluorescence, rapidly changes towards red. The reaction is stopped, by making the solution alkaline with caustic soda, when no increase in the formation of red material is observed but before the color begins to become purple red. The liquor is heated to 60° C. and salted out. The product so obtained appears to be the trisulphuric ester of dichlor-tetrahydrodianthraquinoneazine. In order to purify it from some diester of dichlor-dihydro-dianthraquinone-dihydroazine, it is dissolved in about 100 parts of 1 per cent sodium carbonate solution at 50–60° C., 5 per cent of sodium chloride is added and the liquor is filtered hot. The filtrate is salted out, giving the desired product.

The ester is red in color, and dissolves readily in water to give a carmine red solution. Caustic soda changes the color of the solution to purple. Mineral acid at once decomposes the compound to the blue disulphuric ester of dichlor-dihydrodianthraquinone-dihydroazine. The ester is surprisingly stable in alkaline solution.

Example 16

50 parts of a 4.4 per cent paste of the sodium salt of the ester prepared in the previous example, together with 25 parts of water and 5 parts of 20 per cent caustic soda liquor, are warmed to 70° C. To the deep red solution there are added slowly while stirring 1.5 parts of potassium persulphate. After the addition is complete, 20 parts of saturated brine are added and the product filtered off and washed on the filter with brine.

The new product, having the probable formula:

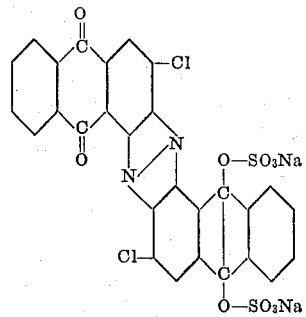

is a red soluble ester, similar in appearance to the starting material but sharply distinguished by its properties. Its solution in water is not colored violet by caustic alkali; on reduction with sulphide or hydrosulphite and alkali, the color of the solution changes to blue green. On treatment with dilute mineral acid the vat dyestuff, dichlor-indanthrone, is precipitated.

In place of persulphate, other alkaline oxidizing agents may be used, as for example, bleach liquor.

The corresponding unchlorinated ester may be produced in like manner by using as starting material the corresponding unchlorinated body.

Example 17

This is a detailed example of the preparation referred to in the last paragraph of Example 16.

200 parts of a paste of the trisulphuric ester of tetrahydro-dianthraquinoneazine of strength 10 per cent (calculated as indanthrone) together with 400 parts of water and 50 parts of 20 per cent caustic soda solution are warmed to 50° C. and 12.5 parts of potassium persulphate are gradually added. When the addition is complete the temperature is raised to 70° C. for half an hour. The liquor is then saturated with salt and filtered, the cake being washed with salt solution containing a little alkali.

The product, having the probably formula:

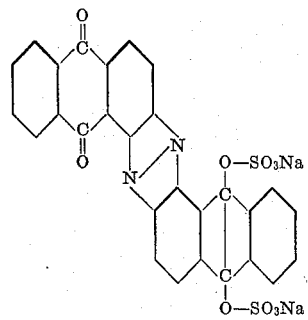

is a bright red body having good solubility. Its properties are similar to the corresponding chlorinated body.

General

The invention is not limited to the above examples and includes processes for the production of ester derivatives and processes for the use of those bodies however made.

References to esters are not confined to the alkali salts but include the free acids and their salts including complex salts.

References to reduced bodies are not limited to bodies involving reduction of the carbonyl-oxygen to hydroxyl, but include further reduction products such as for example, groups to be found in bodies of anthranol type or their tautomeric anthrones.

The new bodies appear to be in some or in all cases sulphuric esters. They may be of various shades, that for instance in Example 14 being of a reddish color. In some or in all cases, for instance, in the case of the example to which reference has just been made, they show good affinity for fibres and the resulting shades are converted instantaneously to what appear to be indanthrone dyes, on immersing in very dilute acid.

The advantages of the part of our process to which reference has just been made consist in or comprise the elimination of an oxidizing agent and in greater convenience in elaboration. This advantage is the more noticeable as indanthrone acids are among the more difficult of oxidation.

The invention contemplates the use in the art of coloring by means of the new bodies as referred to above however these may be prepared, and specific reference is made to their employment in the art of printing, especially in connection with the part of the process to which reference has just been made.

As regards use of the products, they are of general use in the arts of dyes and dyeing or coloring, this general use including dyeing, padding, printing, and pigmenting applied to any suitable product, for instance, cotton, wool, silk, and the usual fibres. The dyeing, or other treatment, consists in general of an impregnation followed by an after treatment of a hydrolytic nature, or of a combined oxidizing and hydrolytic nature.

As many apparently widely different embodiments of this invention may be made without departing from the spirit and scope thereof, it is to be understood that we do not limit ourselves to the specific embodiments thereof except as defined in the appended claims.

In this specification and claims, the term "indanthrone" is used in the broadest sense, that is, to include the azine and dihydroazine forms.

We claim:

1. Enolic sulphuric esters of reduced indanthrones containing not more than three sulphuric ester groups in which at least one sulphuric ester group is attached to each anthraquinone nucleus of the indanthrone molecule.

2. Trisulphuric enolic esters of reduced indanthrones.

3. A trisulphuric enolic ester of tetrahydrodianthraquinoneazine.

4. Trisulphuric enolic esters of reduced 3,3'-dihalogen-indanthrones.

5. A trisulphuric ester of tetrahydro-3,3'-dichloro-dianthraquinoneazine.

6. In the process for preparing di- and tri-sulphuric enolic esters of reduced indanthrones, the step which comprises hydrolyzing a tetrasulphuric enolic ester of a reduced indanthrone in an aqueous medium containing a weak hydrolyzing agent and stopping the reaction prior to complete hydrolysis.

7. In the manufacture of enolic sulphuric esters of the indanthrone series, the step which comprises hydrolyzing the tetrasulphuric ester of a reduced indanthrone in an aqueous alkaline medium and stopping the reaction prior to complete hydrolysis.

8. In the manufacture of enolic sulphuric acid esters of the indanthrone series, the step which comprises heating a tetrasulphuric acid ester of a reduced indanthrone in an aqueous alkaline medium at a temperature of about 60° C.

9. In the process for preparing sulphuric acid esters of the indanthrone series wherein a tetrasulphuric acid ester of a reduced indanthrone is hydrolyzed in an aqueous medium, the steps which comprise heating said tetrasulphuric acid ester in an aqueous medium containing caustic soda and sodium hydro-sulphite to a temperature of about 60° C., discontinuing the heating when one of said sulphuric acid groups has been removed and subsequently heating the trisulphuric acid ester so formed in an aqueous solution containing an alkaline oxidizing agent, and stopping the reaction when a substantial quantity of a disulphuric acid ester is formed.

D. A. W. FAIRWEATHER.
JOHN THOMAS.